Sept. 2, 1969     A. J. GEISENHAVER     3,464,107

COMPRESSOR-MOTOR ASSEMBLY

Filed July 28, 1966     2 Sheets-Sheet 1

INVENTOR.
ARTHUR J. GEISENHAVER

BY
Barnes, Kisselle, Raisch, & Choate

ATTORNEYS

INVENTOR.
ARTHUR J. GEISENHAVER
BY
Barnes, Kisselle, Raisch, & Choate
ATTORNEYS

United States Patent Office 3,464,107
Patented Sept. 2, 1969

3,464,107
COMPRESSOR-MOTOR ASSEMBLY
Arthur J. Geisenhaver, Tecumseh, Mich., assignor to Tecumseh Products Company, Tecumseh, Mich., a corporation of Michigan
Filed July 28, 1966, Ser. No. 568,612
Int. Cl. H02k 15/16, 15/14
U.S. Cl. 29—596　　　　　　　　　　　　　　7 Claims

ABSTRACT OF THE DISCLOSURE

Stator core laminations of an electric motor are assembled on a compressor having a crankshaft operatively connected to the compressor by disposing the laminations on the crankcase of the compressor and then locating the laminations accurately concentric to the crankshaft by means of a radially expandable collet and an arbor which pivots on the crankshaft. The stator is then secured in place while being held concentric to the crankshaft so that the inside diameter of the stator is made uniform due to limited shifting of the individual laminations at the same time that the inside diameter is made concentric with the compressor crankshaft.

---

This invention relates generally to a compressor-motor unit and more particularly to a method for assembling an electric motor stator on the crankcase of a compressor so that the stator is accurately concentric with the rotational axis of a crankshaft of the compressor. This invention also contemplates a tapered arbor and a radially expandable collet which are useful in the method of the present invention.

In certain hermetically sealed compressor-motor units, the stator of the motor is mounted directly on the crankcase of the compressor and the compressor crankshaft is integral with the rotor of the motor. To achieve an optimum air gap with this construction, it is necessary to accurately align the stator concentrically with the rotational axis of the crankshaft. Prior techniques used to assemble the stator on the crankcase are either not completely effective to obtain accurate concentricity over 360 degrees and throughout the entire length of the stator or they are time consuming, relatively expensive and not satisfactory for automated production.

By way of illustration, in one prior technique the rotor is assembled on the crankshaft of the compressor and the stator is then arranged on the rotor. The air gap between the rotor and the stator can then be checked in several places with a feeler gauge and the position of the stator varied slightly to make the air gap uniform or stated differently, to make the stator concentric with the rotor before the stator is fastened on the crankcase. This technique does not assure accurate concentricity over a full 360 degrees and throughout the full length of the rotor. Also, it is relatively inefficient if accurate concentricity is to be achieved. Instead of using a feeler gauge, a cylindrical sleeve whose radial thickness corresponds generally to the size of the air gap can be temporarily inserted in the air gap. After the stator is fastened in place, the sleeve is removed. This technique has obvious disadvantages because the sleeve thickness has to be slightly less than the desired air gap so that the sleeve can be inserted and removed from the air gap. Additionally, an added tolerance in the sleeve thickness is necessary to compensate for any nonuniformity of the stator inside diameter, particularly with stators having laminated cores.

The objects of the present invention are to provide an improved method of assembling an electric motor on a pump such as a refrigeration compressor or the like whereby the stator of the motor is accurately aligned with the crankshaft of the pump and an accurate and uniform air gap between the stator and the rotor of the motor is achieved.

Other objects of the present invention are to effectively achieve accurate assembly of the motor and the pump by a method that is economical and suited to automated production.

Still further objects of the present invention are to provide a radially expandable collet and a tapered arbor for expanding the collet to perform the aforementioned assembly method.

By way of illustration, in the preferred embodiment of the present invention the stator is arranged on the crankcase generally concentric with the crankshaft and the stator is then brought into accurate concentricity with the crankshaft by means of a radially expandable collet and an arbor with the arbor being piloted on the crankshaft. The stator is then secured in place. With laminated stator cores, the inside diameter of the core is also made uniform due to limited shifting of the individual laminations at the same time that the inside diameter is made concentric with the compressor crankshaft.

Other objects, features and advantages of the present invention will become apparent in connection with the following description, the appended claims and the accompanying drawings in which:

Figure 1:
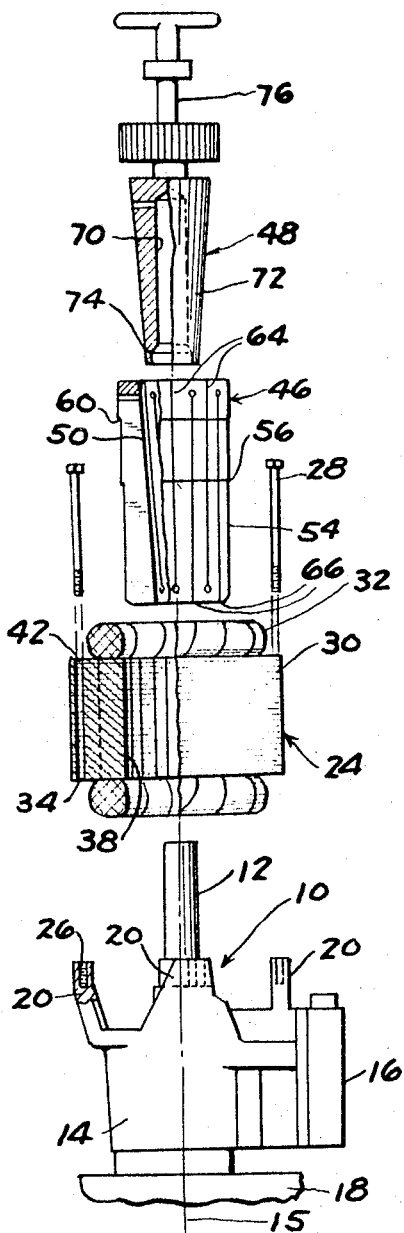
FIG. 1 is an exploded view illustrating a tapered arbor, a radially expandable collet, the stator of a motor, stator bolts and a compressor crankcase aligned prior to assembling the stator on the crankcase in accordance with the present invention.

Referring to FIG. 1 for purposes of illustration a refrigeration compressor 10 is illustarted as substatnially fully assembled with its crankshaft 12 journalled in a crankcase 14 and with a cylinder head 16 fastened on the crankcase. The crankshaft 12 extends outwardly beyond the crankcase 14 for assembly of a motor rotor 17 (FIG. 5) thereon. Compressor 10 is supported on suitable means 18 for performing the assembly method with the crankshaft 12 directed upwardly as illustrated. The crankcase 14 is formed with four upstanding lugs 20 arranged and disposed to support a motor stator 24 on crankcase 14. Each of the lugs 20 has a tapped hole 26 for threadably receiving a respective stator bolt 28 to fasten stator 24 on crankcase 14 after the stator has been accurately aligned concentric with the crankshaft axis 15 by the method of the present invention.

The stator 24 comprises a laminated core 30 on which the usual stator windings 32 are assembled. Core 30 comprises a plurality of vertically stacked laminations 34 (FIGS. 1 and 5) with the assembled laminations having a pole configuration that defines a right-circular cylindrical bore 38 in the core. The stator 24 is of generally conventional construction and the laminations 34 may be secured together by welding, for example, by a plurality of axial welds spaced circumferentially about the outer periphery of core 30 and the welded core may be bonded or unbonded. The core 30 may also comprise unwelded laminations epoxy impregnated and bonded together under pressure. Core 30 also has four axially disposed bolt holes 42 spaced apart circumferentially near the periphery of the core so as to align bolts 28 with holes 26 in the lugs 20 of crankcase 14. There is a slight tolerance between bolts 28 and holes 42 that permits limited shifting of individual laminations as will later be explained.

FIG. 1 also illustrates a radially expandable collet 46 and a tapered arbor 48 for aligning stator 24 concentrically with crankshaft 12 in the preferred embodiment of the present invention. The collet 46 is sleeve-like and has a frusto-conical longitudinal bore 50 accurately concentric with the axis of the collet and tapered radially outwardly from the bottom of the collet toward the top of the collet to receive arbor 48 therein. The peripheral surface of collet 46 has a lower portion 54 which extends longitudinally from the bottom of the collet to a radially outwardly stepped circumferential shoulder 56. The peripheral surface of collet 46 and particularly the lower surface portion 54 is right-circular cylindrical and accurately concentric with the longitudinal axis of bore 50. The outside diameter of the lower surface portion 54 is such that it fits freely but closely within the cylindrical bore 38. The height of the lower surface portion 54 is such that when the collet is assembled in bore 38 with shoulder 56 abutting the top lamination of the core, the outlet extends through and preferably below the core. A second radially stepped circumferential shoulder 60 is provided on collet 24 above shoulder 56 to facilitate handling the collet. Collet 46 also has a first series of longitudinal slots 64 and a second series of longitudinal slots 66 alternately spaced circumferentially about the collet. All of the slots 64, 66 extend radially through the collet 46 between the bore 50 and the otuer surface of the collet. Slots 64 open at the top of collet 46 and terminate just above the bottom of the collet whereas slots 66 open at the bottom of the collet and terminate just below the top of the collet. With this construction, collet 46 can be expanded radially in a very accurate manner.

The arbor has a longtiudinal pilot bore 70 and a frusto-conical outer peripheral surface 72 which tapers radially outwardly from the bottom toward the top of the arbor. The tapered surface 72 is accurately concentric with the axis of the pilot bore 70 and dimensioned to mate with the tapered bore 50 of collet 46 so as to accurately expand the collet radially when the arbor is inserted downwardly into the tapered bore 50. The lower end of bore 70 is chamfered at 74 to pilot crankshaft 12 into the pilot bore 70. The diameter of bore 70 is such that crankshaft 12 fits closely but slidably in bore 70 and arbor 48 can move straight and true on the crankshaft during the assembly method. Arbor 48 also has a handle assembly 76 for gripping and moving the arbor.

Figure 2:
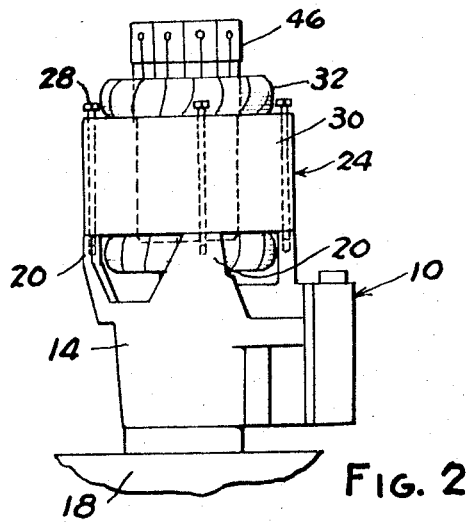
FIG. 2 is a front elevational view of the stator arranged on the crankcase with the collet assembled in the stator after initial steps of the assembly method of the present invention.

The assembly is begun by arranging stator 24 on crankcase 14 with crankshaft 12 disposed in the cylindrical bore 38 and with the bolt holes 42 generally aligned with the tapped holes 26 on the lugs 20. The four stator bolts 28 are then inserted through the bolt holes 42 and started in the tapped holes 26 but the stator bolts are not fully tightened. Collet 46 is then inserted downwardly into cylindrical bore 38 until shoulder 56 bottoms on the top of core 30, crankshaft 12 moving into bore 50. The arrangement of crankcase 14, stator 24, collet 46 and stator bolts 28 at this point in the assembly method is illustrated in FIG. 2.

Next, arbor 48 is started in the bore 50 of collet 46 with crankshaft 12 moving into bore 70 to accurately pilot the arbor. Arbor 48 is then moved downwardly into bore 50 with sufficient impact to expand collet 46 radially against core 30. The lower surface portion 54 of collet 46 expands very accurately concentric with the rotational axis 15 of the crankshaft 12 by reason of accurate concentricity between the axis of bore 70 and surface 72, accurate concentricity between the axis of bore 50 and surface 54 together with an accurate fit of bore 70 on crankshaft 12 and of arbor 48 in bore 50.

It has been found that with either welded or bonded cores, radial expansion of collet 46 causes limited radial shifting of individual laminations 34 relative to other laminations if bore 38 is not uniform. Thus, the diameter of bore 38 is made uniform through 360 degrees and over the full length of the core when collet 46 is expanded. Radial expansion of collet 46 also laterally shifts the loosely secured stator 24 bodily on crankcase 14 to accurately align bore 38 concentric with the rotational axis 15 of the crankshaft 12. With arbor 48 maintained in place and with collet 46 expanded and bore 38 aligned with crankshaft 12, the stator bolts 28 are tightened to firmly fasten core 30 on crankcase 14.

Figure 3:
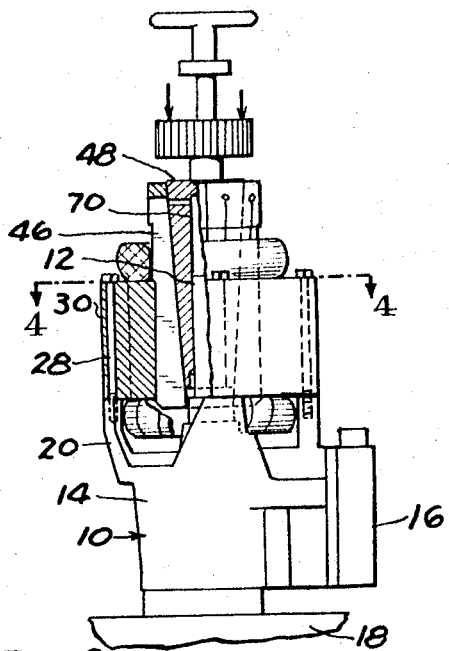
FIG. 3 illustrates the parts as they appear later in the assembly method with the arbor in place to align the stator concentrically with the crankshaft and with the stator fastened on the crankcase.
Figure 4:
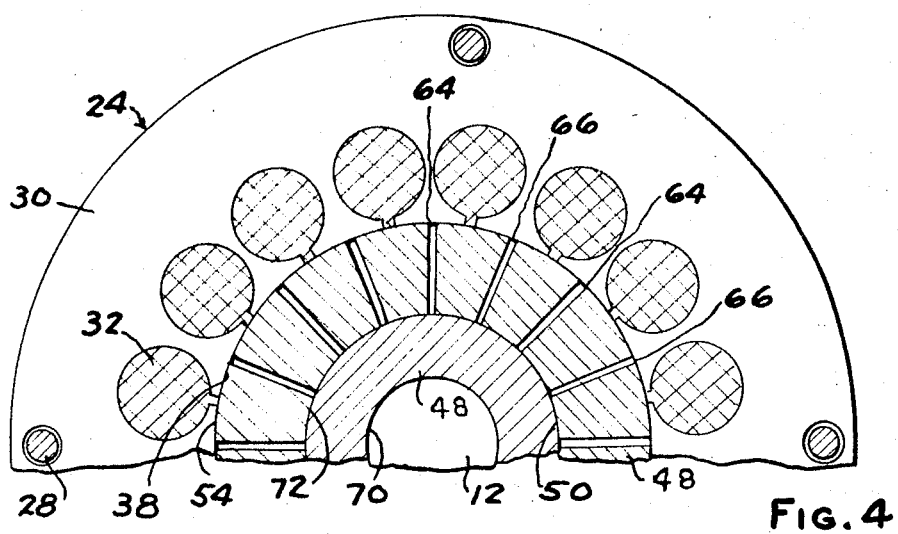
FIG. 4 is a fragmentary section taken on line 4—4 of FIG. 3.

In performing the above assembly by hand, it was found that if sufficient downward force is applied to the arbor 48, it will be frictionally held stationary in collet 46 to maintain the collet expanded while the bolts 28 are tightened. A torque wrench is used to tighten bolts 28 and partial torque is applied to one bolt and then to a second bolt diametrically opposite until all the bolts have been tightened. Full torque is then applied to bolts 28 using the same sequential procedure so that side thrust on core 30 and crankcase 14 is equalized to prevent shifting of the complete assembly. For automated production, collet 46 and arbor 48 can be moved sequentially by a double acting ram. Simultaneous tightening of the four stator bolts 28 is also contemplated to eliminate the problem of side thrust from unequal torque on individual bolts. FIGS. 3 and 4 illustrate the arrangement of arbor 48, collet 46, stator 24, crankcase 14 and stator bolts 28 after the stator bolts have been fully tightened. Arbor 48 is then extracted to release the expansion force from collet 46 so that the collet contracts radially out of engagement with core 30. Collet 46 is then removed from the assembled stator.

Figure 5:
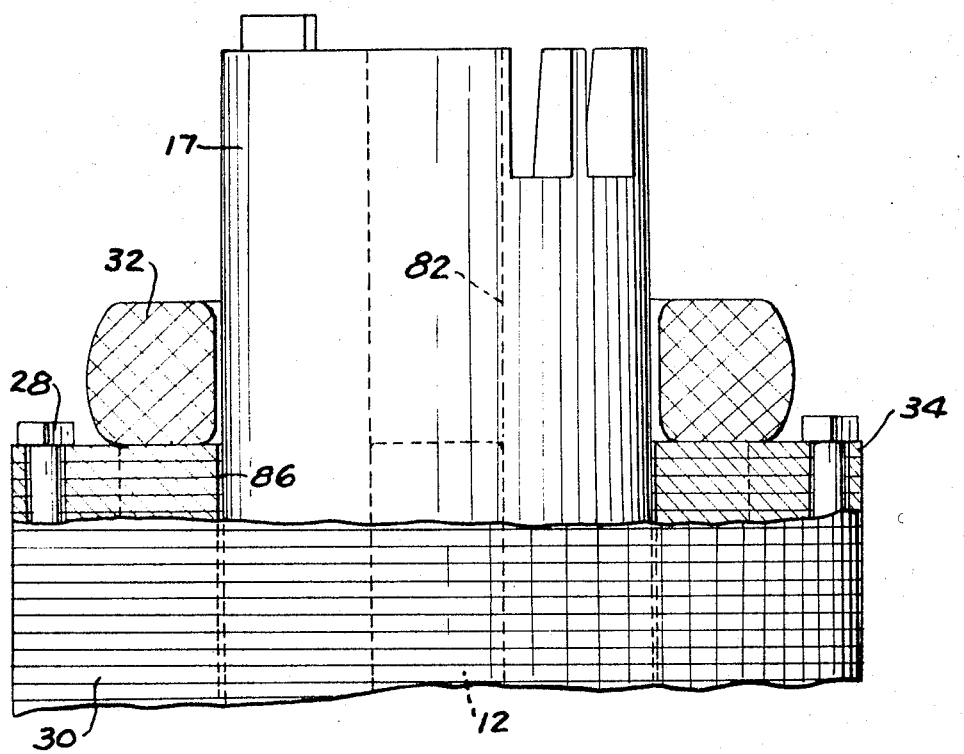
FIG. 5 is a front elevational view partly broken away and partly in section illustrating a rotor assembled in the stator.

Stator 24 has now been assembled on crankcase 14 with bore 38 made uniform and concentric with the crankshaft axis 15. Assembly of the motor is completed by installing rotor 17 (FIG. 5). In the preferred embodiment of the present invention, rotor 17 has a longitudinal bore 82 whose diameter is such that the rotor is pressed on the crankshaft 12 with an interference fit. Since the stator 24 was located with bore 38 concentric with the crankshaft axis 15, when rotor 17 is assembled on crankshaft 12 a uniform air gap 86 is achieved within the concentricity limits of the rotor outside diameter and the bore 38. Uniformity of the air gap 86 is greatly improved over air gaps provided by prior assembly techniques. Also, the size of the air gap can be reduced since it is more accurately controlled relative to prior techniques where tolerances had to be provided to allow for nonuniformity of the core inside diameter (bore 38) and also for eccentricity of the bore with respect to the crankshaft. A reduction in the air gap in turn improves performance of the motor.

The method of assembling a motor-compressor unit and the particular collet and tapered arbor have been described hereinabove for purposes of illustration, and are not intended to indicate the limits of the present invention the scope of which is defined by the following claims.

I claim:

1. In the method of assembling a compressor-motor unit wherein said compressor comprises a case having a crankshaft journalled therein with an end portion of said crankshaft projecting outwardly from said case and wherein said motor includes a rotor and a stator core, said core having a plurality of laminations whose pole configurations define a generally right-circular cylindrical bore to accommodate said rotor therein with an air gap between said core and said rotor, comprising the steps of arranging said core on said case with a rotational axis of said crankshaft disposed generally parallel to an axis of revolution of said core bore, providing in said bore a right-circular cylindrical wall surface, expanding said wall surface radially outwardly into engagement with said laminations while maintaining said wall surface concentric with said rotational axis to make said bore concentric with said rotational axis, securing said core tightly to said case while said bore is maintained concentric with said rotational axis by said expanded wall surface, radially contracting said wall surface out of engagement with said laminations, removing said wall surface from said bore and assembling said rotor in said bore concentrically with said crankshaft end portion so that by assembling said stator concentric with said rotational axis and also assembling said rotor concentric to said rotational axis an accurate uniform air gap is achieved.

2. The method set forth in claim 1 wherein said wall surface is provided by radially expandable means having a pilot bore accurately concentric with said wall surface and wherein said crankshaft end portion is inserted into said pilot bore to maintain said wall surface and said stator core bore concentric with said rotational axis during radial expansion of said wall surface.

3. The method set forth in claim 2 wherein said laminations are capable of at least limited shifting relative to each other in a direction radially of said bore and said wall surface is provided over substantially 360 degrees and throughout the length of said bore, said wall surface is expanded radially outwardly in a uniform manner into engagement with said laminations at a plurality of points spaced circumferentially of said wall surface while maintaining said points of engagement radially equidistant from said crankshaft end portion so that when said wall surface is moved radially into engagement with said bore said laminations are shifted relative to each other to align pole configurations of individual laminations with each other and simultaneously align said bore concentric with said rotational axis.

4. The method set forth in claim 1 wherein said crankshaft is assembled in an axial bore of said rotor with an interference fit to secure said rotor in driving connection with said shaft.

5. In the method of assembling an electric motor with a compressor wherein said compressor comprises a case having a crankshaft journalled therein and in driving relation with said compressor with an end portion of said crankshaft projecting outwardly from said case and wherein said motor includes a rotor and a stator core, said core having an inner peripheral wall defining a bore to accommodate said rotor therein with an air gap therebetween, the steps of locating said core relative to said casing at a position approximately corresponding to a final assembled position of said core relative to said casing, inserting within said bore a radially expandable collet defining a radially expanding wall surface and having a frusto-conical longitudinal bore therethrough tapered radially outwardly in a direction from the bottom of said collet to the top of said collet, moving downwardly into said collet bore a frusto-conical arbor tapered radially inwardly from the top of said arbor to the bottom of said arbor to mate with said collet bore to expand said collet radially outwardly, locating said end portion of said crankshaft in a pilot bore in the lower end of said arbor during downward movement of said arbor, said pilot bore being accurately concentric with respect to said tapered arbor and accurately dimensioned relative to said crankshaft end portion to maintain said wall surface accurately concentric relative to said crankshaft during radial expansion of said collet to thereby make said stator core bore concentric with said crankshaft end portion, tightly securing said core to said casing while said stator core bore is maintained concentric with said crankshaft, removing said arbor and said collet from said stator core bore, and then assembling said rotor on said crankshaft and in said stator core bore so that by assembling said stator concentric with said crankshaft end portion said rotor is concentric to said stator core bore and an accurate uniform air gap is achieved.

6. The method set forth in claim 5 wherein said rotor is assembled on said crankshaft with an interference fit.

7. The method set forth in claim 5 wherein said stator comprises a laminated core having a plurality of stacked laminations whose pole configurations define said stator core bore, said laminations being capable of at least limited shifting relative to each other in a direction radially of said stator core bore and wherein said wall surface is provided over substantially 360 degrees and throughout the length of said stator core bore, said wall surface is expanded radially outwardly in a uniform manner into engagement with said laminations at a plurality of points spaced circumferentially of said wall surface while maintaining said points of engagement radially equidistant from said crankshaft end portion so that when said wall surface is expanded radially into engagement with said stator core bore said laminations are shifted relative to each other to bring pole configurations of individual laminations into alignment with substantially all of the other individual laminations and simultaneously align said stator core bore concentric with said crankshaft.

References Cited

UNITED STATES PATENTS

| | | | |
|---|---|---|---|
| 2,453,297 | 11/1948 | Benson | 29—596 |
| 2,552,043 | 5/1951 | Horvath | 33—175 X |
| 2,584,611 | 2/1952 | Peden | 29—235 |
| 2,911,709 | 11/1959 | Boynton | 29—596 |
| 2,944,283 | 7/1960 | Lawson | 29—235 X |
| 3,256,590 | 6/1966 | Myers | 29—596 |
| 3,344,513 | 10/1967 | Bemmenn et al. | 29—596 |
| 3,348,300 | 10/1967 | Lundgren | 29—596 |

JOHN F. CAMPBELL, Primary Examiner

R. B. LAZARUS, Assistant Examiner

U.S. Cl. X.R.

29—235, 464, 465, 468

PO-1050
(5/69)

UNITED STATES PATENT OFFICE
CERTIFICATE OF CORRECTION

Patent No. 3,464,107     Dated September 2, 1969

Inventor(s) A. J. Geisenhaver

It is certified that error appears in the above-identified patent and that said Letters Patent are hereby corrected as shown below:

In Column 1, line 18, delete "pivots" and insert in place thereof --pilots--. In Column 2, line 47, delete "illustarted" and insert in place thereof --illustrated--; ar in line 47, delete "substatnially" and insert in place therec --substantially--. In Column 3, line 27, delete "outlet" and insert in place thereof --collet--; and in line 35, delete "otuer" and insert in place thereof --outer--. In Column 5, line 23 (claim 3), delete "2" and insert in place thereof --1

SIGNED AND
SEALED
MAY 12 1970

(SEAL)
Attest:

Edward M. Fletcher, Jr.
Attesting Officer

WILLIAM E. SCHUYLER, JR.
Commissioner of Patents